United States Patent [19]
Fiala

[11] 3,741,494
[45] June 26, 1973

[54] ENERGY ABSORBER FOR AUTOMOBILE SAFETY BELTS

[75] Inventor: Ernst Fiala, Berlin, Germany

[73] Assignee: Wolf-Dieter Klink, Lindach, Germany

[22] Filed: May 26, 1971

[21] Appl. No.: 146,887

[30] Foreign Application Priority Data
May 29, 1970  Germany................... P 20 26 277.5

[52] U.S. Cl...... 242/107.4, 242/107 SB, 242/107.3, 297/386
[51] Int. Cl............................................ A62b 35/00
[58] Field of Search............ 242/54, 107 R, 107 SB, 242/107.4, 107.5, 107.6, 99; 297/385, 386, 388; 280/150 SB

[56] References Cited
UNITED STATES PATENTS
3,561,690  2/1971  Muskat........................... 297/386 X
3,632,060  1/1972  Balder........................... 242/107.4 X Primary Examiner—Werner H. Schroeder
Attorney—Curt M. Avery, Arthur E. Wilfond, Herbert L. Lerner and Daniel J. Tick

[57] ABSTRACT

An energy absorber for automobile safety belts which comprises a mounting rigidly or non-rigidly coupled to the chassis, a take-up member which is rotatable relative to the mounting and a torsion bar located between the mounting and the take-up member such that when an impact force is sensed, the torsion bar absorbs the energy of the impact force.

14 Claims, 8 Drawing Figures 3,741,494

ENERGY ABSORBER FOR AUTOMOBILE SAFETY BELTS

My invention relates to the absorption of energy for restraining systems in passenger vehicles, particularly energy absorbers for safety belts used therein.

Movement restraining systems, such as belts or seats, for passenger vehicles must absorb substantial amounts of energy during accidental impact, and the forces acting on the body of the passenger must not exceed certain values to prevent injury. Existing systems fail to provide for sufficient energy absorption to prevent such injury.

An object of my invention is to provide a small, lightweight energy absorbent system of the kind mentioned above which can absorb large amounts of energy.

Another object of my invention is to provide such an energy absorbent system which can be used with present safety belts without significant modification thereof.

Still another object of my invention is to provide such an energy absorbent system which can be conveniently installed in automotive vehicles.

Another object of my invention is to provide an energy absorbent system which can be used with two- and three-point seat belts and harnesses.

Other objects, advantages and features of the present invention will become more apparent from the following description.

In accordance with my invention, the above objects are accomplished by providing an energy absorber which consists of a take-up member for transmitting the impact force to a rotatable mounting and a torsion bar which connects the take-up member to the mounting and can absorb large amounts of energy when the take-up member rotates relative to the mounting.

The invention will be further described with reference to embodiments thereof, illustrated by way of example on the accompanying drawings in which.

Figure 1:
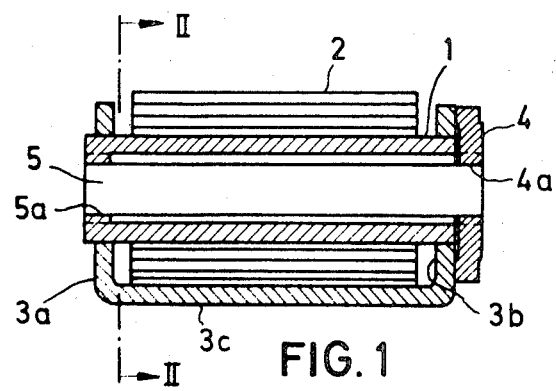
FIG. 1 is a longitudinal cross-sectional view through a first embodiment of execution of my invention.
Figure 2:
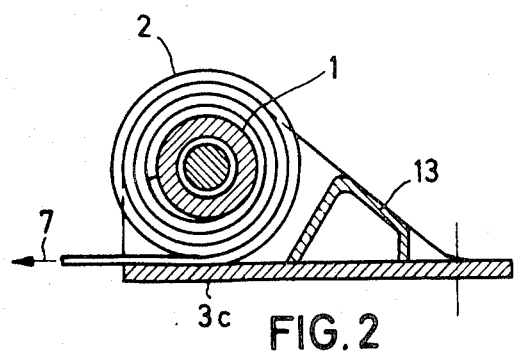
FIG. 2 is a cross-sectional view through lines II—II of FIG. 1.

Referring to the drawings, and in particular to FIGS. 1 and 2, there is shown a support which consists of a U-shaped bracket having left-hand leg 3a, a right-hand leg 3b and a connecting base part 3c. The base 3c is rigidly connected with the vehicle or the restraining system, and may, for example, be bolted to the floor of the vehicle as the tie point of one end of the safety belt. A sleeve 1 is rotatably supported in the legs 3a and 3b with a force-transmitting part 2 wound thereon, such as a safety belt. The force-transmitting part can also be a steel band or a rope. A torsion rod 5 is located inside the sleeve 1 and is connected at its left end 5a with the sleeve 1 rigidly secured against rotation by locking means, such as teeth or a square or hexagonal locking member.

Rotation of the sleeve 1 therefore results in the torsion rod 5 being rotated along at its left end 5a. At its right end 4a, the torsion rod is also positively connected by means of a suitable tooth arrangement or by a square or hexagonal locking means with a flange 4. The flange 4, in turn, is connected against rotation, with the leg 3b of the U-bracket 3. Arrow 7 indicates the unwinding direction of the safety belt 2, and for transmission of the torque in the U-bracket 3, a stiffening member 13 can be provided between the legs 3a and 3b. As the belt 2 unwinds, the torsion bar effects its shock absorbing action.

Figure 3:
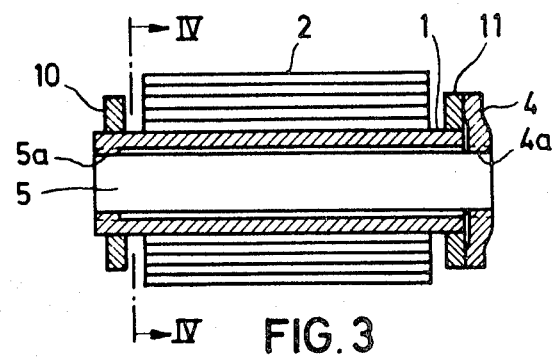
FIG. 3 is a longitudinal cross-sectional view through another embodiment of my invention.
Figure 4:
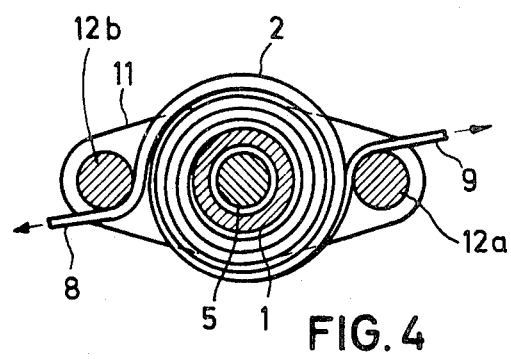
FIG. 4 is a cross-sectional view along lines IV—IV of FIG. 3.

FIGS. 3 and 4 show another embodiment of my invention. In this embodiment, the safety belt 2 is wound on a sleeve 1, which surrounds a torsion rod 5. The torsion rod 5 is connected at its left end 5a with the sleeve 1 securely against rotation, and is connected at its right end 4a with the flange 4 securely against rotation. End support legs 11 and 12 are provided, their shape being shown in FIG. 4. These legs 11 and 12 are secured against rotation and connected with each other by means of the two bolts 12a and 12b. The flange 4 is non-rotatably connected with the right-hand leg 11. The safety belt 2 has two ends 8 and 9, which unwind around the two bolts 12b and 12a, respectively, and twist around the torsion rod 5 with the safety belt 2 being firmly connected with the sleeve 1. In order to obtain the same force limitation as with the embodiment of FIGS. 1 and 2, the diameter of the torsion rod is larger, because the two belt ends act upon the sleeve 1 with both wound on the sleeve 1.

According to the embodiment of FIGS. 3 and 4, the mounting has the two parallel legs which are flanges and are held in a non-rotatable mutual relation by means of the two connecting bolts 12a and 12b, wherein the two ends of the force-transmitting member or safety belt 2 are wound on the take-up member from opposite sides and are led around the connecting bolts in such a manner that in the event of a stretching of the safety belt 2 and the resulting rotation of the take-up member 5, the mounting is braced at the force-transmitting part by means of the connecting bolts. Such a device can be inserted into a safety belt without difficulty and does not have to be connected firmly with the chassis frame.

In the embodiment of FIGS. 1 and 2, two belts also can be used, for instance, the shoulder and hip belt of a three-point harness.

Figure 5:
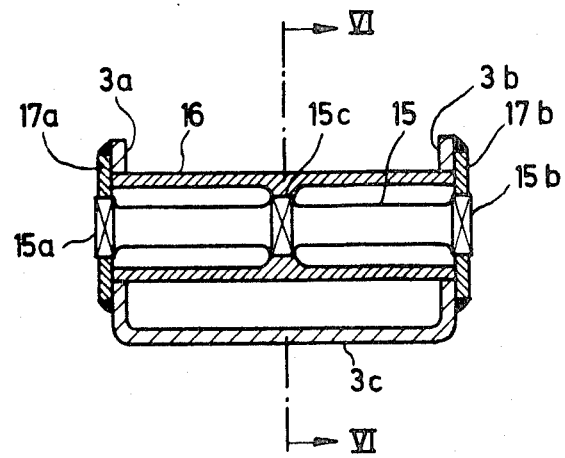
FIG. 5 is a longitudinal cross-sectional view through a third embodiment of my invention.
Figure 6:
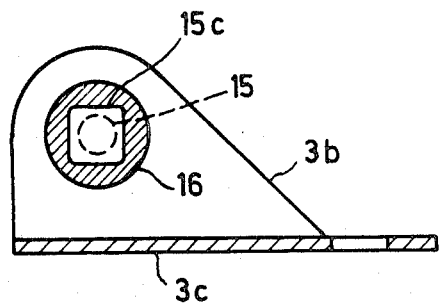
FIG. 6 is a cross-sectional view through lines VI—VI of FIG. 5.

FIGS. 5 and 6 show yet another embodiment of my invention. A sleeve 16 is supported rotatably between legs 3a and 3b of a U-bracket mounting 3. The sleeve 16 surrounds the torsion rod 15, which has, at its center, a square 15c engaging a correspondingly shaped opening in a constriction of the sleeve 16. By providing a square, the sleeve is connected with the center part of the torsion rod 15, and is secured against rotation. The torsion rod 15 also has, at its ends, two additional squares 15a and 15b which engage correspondingly shaped openings in side plates 17a and 17b. The plates 17a and 17b are rigidly connected with the adjoining legs 3a and 3b. In the installed condition, the safety belt (not shown) is wound on the sleeve 16. The unwinding of the safety belt results in rotation of the sleeve 16, and the forces caused by the twisting of the torsion rod 15 act against this rotation. Also in this embodiment, the connecting base part 3c of the bracket 3 is rigidly fixed with the vehicle or the restraining device, for instance, by bolts. Instead of the square shapes shown, tooth arrangements or other forms can also be chosen which prevent rotation of the elements at the joints. Instead of a single belt, several belts can also be wound on the sleeve 16. In the embodiment of FIGS. 5 and 6, the torsion bar is non-rotatably supported at its center with respect to the sleeve and rotatably in the mounting at its two ends.

The device according to my invention allows for the belt 2 to be prebiased as it is wound. The device can be located at several points, for instance, between the shoulder and the attachment to the vehicle (FIG. 2). It is also possible to combine the device with a belt buckle and with devices which increase the tension in the belt at the start of an accident.

Figure 7:
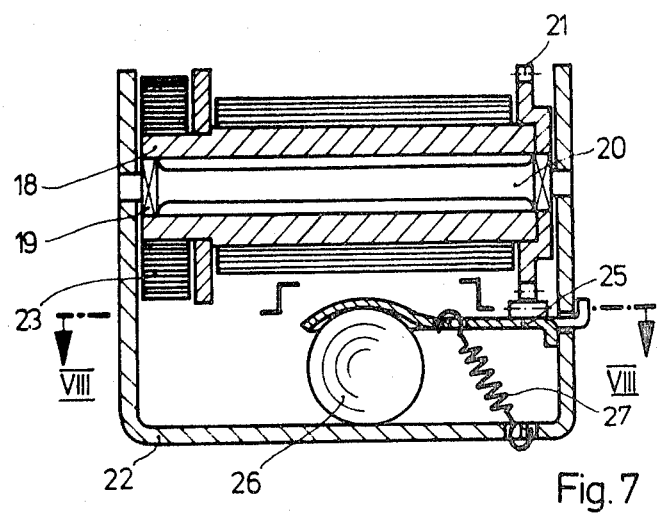
FIG. 7 is a longitudinal cross-sectional view through an automatic belt mechanism.
Figure 8:
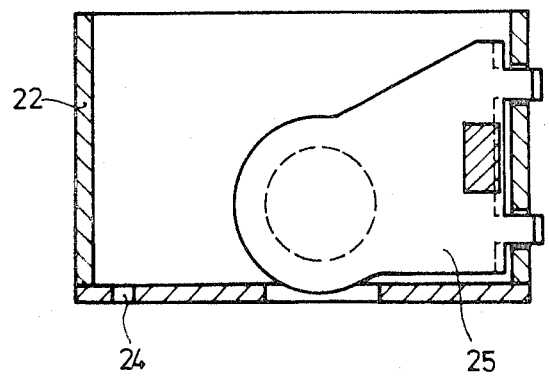
FIG. 8 is a cross-sectional view through lines VIII—VIII of FIG. 7.

An automatic belt mechanism is shown in FIGS. 7 and 8. The take-up member 18 is supported on a square 19 of the torsion rod 20 and on the other side in a gear 21. The torsion rod 20, itself, is supported rotatably in a U-shaped support 22. A spiral spring 23 is attached, at one end, in a slot of the take-up member 18 and at its other end in an opening 24 of the rear wall of the support 22. By means of the spring 23, the belt 2 is continuously wound on the take-up member 18 with a force of about 300 ponds (grams). Underneath the take-up member 18, a locking lever 25 is arranged which is fulcrumed in cutouts in the support 22 and rest with its free end which has the form of a ball socket, on the ball 26. The locking lever 25 is kept in the rest position by a spring 27, the spring 27 being matched to the mass of the ball 26 in such a manner that a predetermined horizontal acceleration (about 5 m/sec²) or a rotation of the earth acceleration vector by more than 30° causes a relative motion of the ball 26 with respect to the support 22, and the locking lever is lifted so far that the teeth of the gear 21 are blocked by one or several cogs arranged at the locking lever 25. In this operating condition of the automatic belt mechanism, the belt can be pulled from the take-up member 18 only through deformation of the torsion rod 20, so that the force acting on the belt is converted into deformation energy.

A torsion rod as the energy converter can be applied, according to the embodiment of FIGS. 7 and 8, to the automatic belt mechanism, in which a clutch is arranged between the torsion rod and the mounting, which is not effective under normal driving conditions, so that the safety belt is unwound from the sleeve 1 as required and can be rewound by a spring tensioned in the process. Only in the event of danger, the clutch is actuated by the inertial member 26 due to the accompanying velocity change, in such a manner that one end of the torsion rod 20 becomes connected and rigidly secured against rotation relative to the mounting 22, while the other end of the torsion rod is rigidly connected with the sleeve on which the safety belt is wound.

In all the above embodiments, the forces occurring in the event of an accidental shock are controlled best and transmitted to the passenger in the most gentle manner if the torsion bar is provided with elastic and plastic deformability with only relatively little elastic deformability as compared to its plastic deformability, the plastic deformability occurring only under excessive strain.

It has been found preferable that the torsion bar be stressed exclusively for torsion in the event of rotation between the mountings and the take-up members.

Due to the compact form of the torsion rod, the elastic deformation is small, as desired. After the elastic limit is exceeded, the plastic torsional deformation takes place which, through the choice of a tough material, can stand three to five revolutions before fracture occurs. In this process, the safety belt unwinds from the take-up member, while the force in the plastic deformation phase increases only relatively little after it had risen steeply during the elastic phase. The energy is therefore absorbed in the desired manner as deformation energy of the torsion rod.

For compactness, in the embodiments above, the sleeves surround the corresponding torsion bars.

It will thus be seen that the objects set forth above, among those made apparent from the preceding description, are efficiently attained and, since certain changes may be made in the above apparatus without departing from the scope of the invention, it is intended that all matter contained in the above description and shown in the accompanying drawings shall be interpreted as illustrative and not in a limiting sense.

I claim:

1. Energy absorber for restraining systems in passenger vehicles comprising a take-up member, a force-transmitting member and a mounting rotatable relative to said take-up member, and an elongated torsion bar rotated about its longitudinal axis between said mounting and said take-up member for absorbing large amounts of energy when the take-up member rotates relative to the mounting.

2. Energy absorber according to claim 1, wherein said torsion rod is capable of being plastically deformed.

3. Energy absorber according to claim 2, wherein said torsion bar is capable of being plastically deformed with said elastic deformability being relatively slight as compared to its plastic deformability.

4. Energy absorber according to claim 3, wherein said torsion bar is stressed only for torsion for accommodating rotation between said mounting and said take-up member.

5. Energy absorber according to claim 1, wherein said mounting comprises a U-shaped bracket having two legs connected with each other non-rotatably, each of said legs having an opening to rotatably support the take-up member, said take-up member forming a sleeve.

6. Energy absorber according to claim 1, wherein said mounting is rigidly connected with the vehicle.

7. Energy absorber according to claim 1, wherein said force-transmitting member is an automobile seat belt.

8. Energy absorber for restraining systems in passenger vehicles comprising a take-up member, a force-transmitting member and a mounting rotatable relative to said take-up member, said mounting comprising a U-shaped bracket having two legs connected with each other non-rotatably, each of said legs having an opening to rotatably support the take-up member, said take-up member forming a sleeve, and a torsion bar rotated between said mounting and said take-up member for absorbing large amounts of energy when the take-up member rotates relative to the mounting; said torsion bar being connected at one of its ends non-rotatably with said sleeve and at its other end non-rotatably with one of said legs via an intermediate member.

9. Energy absorber according to claim 8, wherein said intermediate member is a flange having an opening with which said one end of the torsion bar is in positive engagement.

10. Energy absorber for restraining systems in passenger vehicles comprising a take-up member, a force-transmitting member and a mounting rotatable relative to said take-up member, said mounting comprising a U-shaped bracket having two legs connected with each other non-rotatably, each of said legs having an opening to rotatably support the take-up member, and a torsion bar rotated between said mounting and said take-up member for absorbing large amounts of energy when the take-up member rotates relative to the mounting, said take-up member forming a sleeve which surrounds said torsion bar.

11. Energy absorber for restraining systems in passenger vehicles comprising a take-up member, a force-transmitting member and a mounting rotatable relative to said take-up member, and a torsion bar rotated between said mounting and said take-up member for absorbing large amounts of energy when the take-up member rotates relative to the mounting, said take-up member forming a sleeve, said torsion bar being supported at its center non-rotatably relative to said sleeve, and at both of its ends non-rotatably in said mounting.

12. Energy absorber for restraining systems in passenger vehicles comprising a take-up member, a force-transmitting member and a mounting rotatable relative to said take-up member, and a torsion bar rotated between said mounting and said take-up member for absorbing large amounts of energy when the take-up member rotates relative to the mounting, said mounting having two parallel legs formed of flanges, two connecting bolts holding said legs in a non-rotatable mutual relation, said force-transmitting member having two ends wound on said take-up member from opposite sides and being fed around the respective connecting bolts so that when said force-transmitting member stretches said take-up member rotates, and the mounting is braced at the force-transmitting member by means of said connecting bolts.

13. Energy absorber for restraining systems in passenger vehicles comprising a take-up member, a force-transmitting member and a mounting rotatable relative to said take-up member, a torsion bar rotated between said mounting and said take-up member for absorbing large amounts of energy when the take-up member rotates relative to the mounting, and a clutch means responsive to a horizontal acceleration or a rotation of the earth acceleration vector being connected between said torsion bar and take-up member for blocking the rotation of said take-up member.

14. Energy absorber according to claim 13, wherein said clutch means comprises a gear rigidly connected with one end of the torsion bar and a lever having a free end, having the form of a ball socket, said lever resting on a spherical inertial member and having blocking cogs which engage with said gear in the coupled condition.

* * * * *